US007002948B2

(12) United States Patent
Kato

(10) Patent No.: US 7,002,948 B2
(45) Date of Patent: Feb. 21, 2006

(54) MOBILE COMMUNICATION SYSTEM AND METHOD OF CONTROLLING SYNCHRONIZATION BETWEEN BASE STATIONS

(75) Inventor: Kenichi Kato, Tokyo (JP)

(73) Assignee: NEC Corporation, (JP)

( * ) Notice: Subject to any disclaimer, the term of this patent is extended or adjusted under 35 U.S.C. 154(b) by 864 days.

(21) Appl. No.: 09/726,870

(22) Filed: Nov. 30, 2000

(65) Prior Publication Data

US 2001/0038622 A1 Nov. 8, 2001

(30) Foreign Application Priority Data

Nov. 30, 1999 (JP) .................................. 11-340044

(51) Int. Cl.
H04J 3/06 (2006.01)
H04B 7/212 (2006.01)
H04B 7/216 (2006.01)

(52) U.S. Cl. ........................ 370/350; 370/335; 370/347
(58) Field of Classification Search ........ 370/321–350, 370/503–514; 375/354–368; 455/127.1, 455/422–502; 340/310.04, 572.1, 572.4, 340/310, 572
See application file for complete search history.

(56) References Cited

U.S. PATENT DOCUMENTS

| 5,379,326 A | * | 1/1995 | Nakahara et al. ............ 375/354 |
| 5,388,102 A | * | 2/1995 | Griffith et al. ............... 370/512 |
| 5,483,677 A | * | 1/1996 | Brydon et al. ............. 455/67.16 |
| 5,528,597 A | * | 6/1996 | Gerszberg et al. ........... 370/347 |
| 5,920,557 A | * | 7/1999 | Hirata ......................... 370/350 |
| 5,940,384 A | * | 8/1999 | Carney et al. ............... 370/347 |
| 6,031,828 A | * | 2/2000 | Koro et al. .................. 370/336 |
| 6,151,311 A | * | 11/2000 | Wheatley et al. ........... 370/335 |
| 6,320,507 B1 | * | 11/2001 | Strzelec et al. .......... 340/572.1 |
| 6,477,385 B1 | * | 11/2002 | Hara ........................... 455/502 |
| 6,560,215 B1 | * | 5/2003 | Bloem et al. ................ 370/347 |
| 6,590,881 B1 | * | 7/2003 | Wallace et al. .............. 370/332 |

FOREIGN PATENT DOCUMENTS

| JP | 63-232633 | 9/1988 |
| JP | 7-298347 | 11/1995 |
| JP | 11-68649 | 3/1999 |

OTHER PUBLICATIONS

Japanese Office Action issued Mar. 18, 2002 (w/ English translation of relevant portion).

* cited by examiner

Primary Examiner—Man U. Phan
(74) Attorney, Agent, or Firm—Dickstein, Shapiro, Morin & Oshinsky, LLP.

(57) ABSTRACT

A mobile communication system has a plurality of base stations which are located at appropriate positions within a predetermined area and conduct radio communication with a mobile communication terminal, and an exchange office which is connected with the base stations and conducts the exchange control toward an external network, and which offers a Time Division Multiplex radio communications by supplying a synchronizing signal to each of the base stations. The system further has delay time detection means for detecting an arrival delay time of the synchronizing signal to each of the base stations, computation means for computing a timing correction value which synchronizes a radio communication timing of all of the base stations for each base station on the basis of a delay time detected, and correction means for correcting the synchronizing signal supplied to the base stations according to the timing correction value.

8 Claims, 6 Drawing Sheets

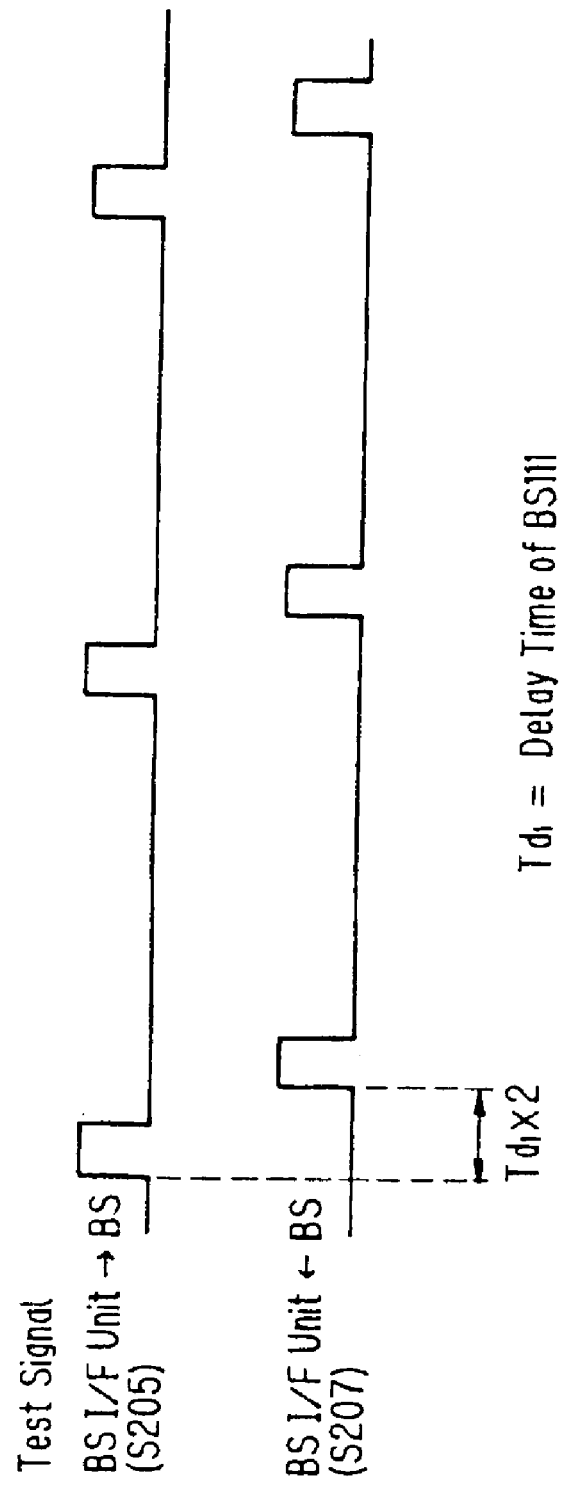

MOBILE COMMUNICATION SYSTEM AND METHOD OF CONTROLLING SYNCHRONIZATION BETWEEN BASE STATIONS

FIELD OF THE INVENTION

The invention relates to a mobile communication system and a method of controlling synchronization between base stations, more particularly to a mobile communication system conducting radio communication by Time-Division Multiplex and a method of controlling synchronization between base stations for the same.

BACKGROUND OF THE INVENTION

For instance, in a mobile communication system conducting radio communication in Time-Division Multiplex, such as PHS (Personal Handyphone system), a large number of base stations are placed at appropriate positions within a predetermined area, and thus continuous services are secured by switching base station in radio communication even when communication terminal calling via base station in 1 moves out of service area of such base station.

In the conventional mobile communication system of this type, if there is a difference in frame timing of radio communication between adjacent base stations, service failure occurs and smooth changeover of base station in communication involved in a position shift. Therefore, it is important to synchronize frame timing of each base station. One of the conventional technology of synchronizing frame timing of each base station is a method to supply synchronizing signals from exchange device (henceforth, PBX), which is a host device of base station (henceforth, BS), to each BS. To explain this conventional technology referring to FIG. 1, synchronizing signal generator unit 107 is provided in PBX 101, and it comprises so as to synchronize each BS by supplying synchronizing signal with same timing to each of BS111 to 113 via BS I/F unit 108 to 110.

Further, a mobile communication system is disclosed in Japanese Patent Application Laid-Open No. 11-68649, which is construed to cut the cost and increase the stability of the system by connecting speech path switch for switching the internal and external lines and by comprising so that each BS can receive synchronizing signal via this speech path.

However, there is a following disadvantage in the conventional synchronization control between base stations.

A communication system of this type has a large number of BS placed within a predetermined area as above, and the distance from the host device PBX to each BS differs according to the position the BS is placed. In this case, arrival timing of synchronizing signal at a BS distant from PBX, i.e. a BS with a long signal transmission path, may be delayed, and thus a difference of synchronizing signals between BS's is produced.

Following are explanations of synchronizing signal delay and a difference of radio transmission timing referring to FIG. 2.

As shown in FIG. 2, three BS 402 to 404 are connected with PBX401, with BS 402 and BS 403 installed at approximately equal distance from PBX 401 and with BS 404 installed in a relatively remote position. From PBX 401, synchronizing signal 408 is output toward each BS with the same timing. When transmission path of BS 404 is longer than the other BS's as this, the timing synchronizing signal arrives at BS404 is later than the other BS's. (See Code 409)

Since each BS conducts radio communication with timing of synchronizing signal supplied to it, as for radio communication timing 405 to 407 of each BS, radio communication timing 407 or BS 404 is delayed by Td compared with timing of other BS's.

In such case, for instance, when communication terminal BS is in the position that allows receiving electric wave from BS 403 and 404, n communication failure may occur due to interference of time frame. Further, for instance, when a mobile communication terminal in communication with BS403 shifts its position and switches communication to B404, smooth changeover may be inhibited and fault such as circuit cut off may arise.

SUMMARY OF THE INVENTION

Accordingly, it is an object of the present invention to provide a system which synchronizes timing of radio communication at each BS and a method for controlling the same.

According to a first features of the present invention, a mobile communication system comprising a plurality of base stations which are located at appropriate positions within a predetermined area and conduct radio communications with a mobile communication terminal, and an exchange office which is connected with the base stations and conducts the exchange control toward an external network, said exchanged office conducting a Time Division Multiplex radio communication by providing a synchronizing signal from the exchange office to each of the base stations, the system further comprises:

delay time detection means for detecting an arrival delay time of the synchronizing signal to each of the base stations;

computation means for computing a timing correction value which synchronizes a radio communication timing of all of the base stations for each base station on the basis of a delay time detected; and correction means for correcting the synchronizing signal supplied to the base stations according to the timing correction value.

To correct the timing difference of radio communication due to sporadic installation positions of base stations, according to the invention, an arrival delay time of the synchronizing signal for each of the base stations is detected, a timing correction value which synchronizes radio communication timing of all of the base stations for each base station on the basis of a delay time detected is computed, and the synchronizing signal supplied to the base stations is corrected according to the timing correction value. Consequently, timing of radio communication for all the base stations can be synchronized. Therefore, interference to time slot from adjacent base station and communication failure due to changeover of base stations is to be prevented.

Still, according to a second feature of the present invention, it is preferable that the delay detection means comprises:

means installed in the exchange office for generating a test signal for delay time detection and sending the test signal to the base stations;

means for sending by return the test signal sent from the exchange office at the base station; and measuring means for receiving the test signal sent by return from the base stations and for measuring a time difference between times of transmission and arrival of the test signal.

Thus, an accurate amount of delay time of signal path transmission for each base station can be obtained, if test signal sent from a exchange office is sent by return at the base station and if delay time is detected from a time lag of the signal's arrival at the base station.

Furthermore, according to a third feature of present invention, a method of controlling synchronization between base stations in a mobile communication system comprising a plurality of base stations which are located at appropriate positions within a predetermined area and conduct radio communications with a mobile communication terminal, and an exchange office which is connected with the base stations and conducts the exchange control toward an external network, the exchange office conducting a Time Division Multiplex radio communication by providing a synchronizing signal from the exchange office to each of the base stations, the method comprises the steps of:

detecting an arrival delay time of the synchronizing signal to each of the base stations;

computing a timing correction value which synchronizes timing of radio communication of all the base stations on the basis of delay time detected for each of the base stations; and correcting the synchronizing signal supplied to the base station according to the timing correction value.

BRIEF DESCRIPTION OF THE DRAWINGS

The invention will be explained in more detail in conjunction with appended drawings, wherein:

FIG. 6 is a diagram showing an example of a test signal arriving at a delay time detection unit shown in FIG 1.

DESCRIPTION OF THE PREFERRED EMBODIMENT

Preferred embodiment according to the invention will be thoroughly explained below in conjunction with appended drawings.

Figure 1:
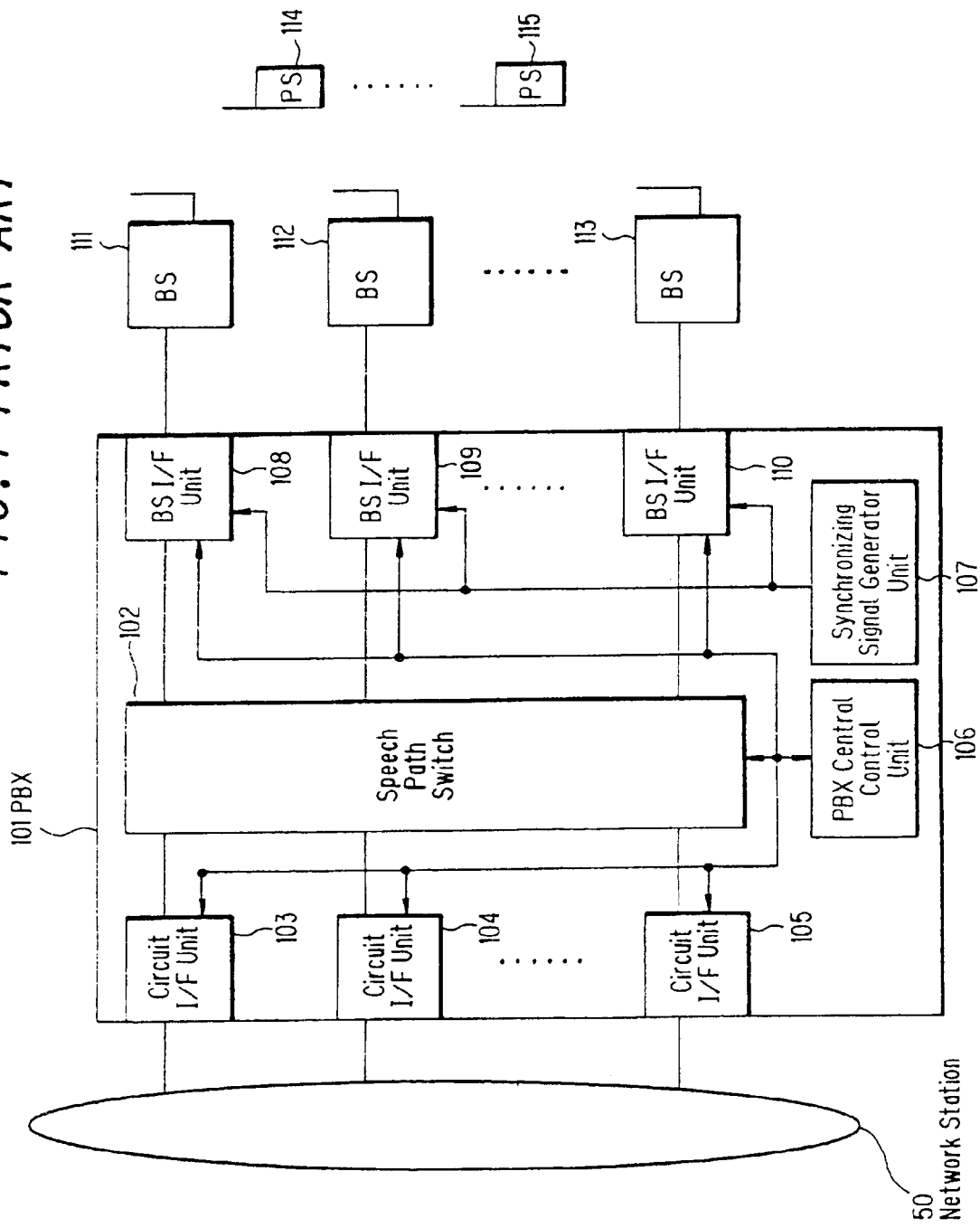
FIG. 1 is a block diagram showing the outline of a mobile communication system in a first preferred embodiment according to the present invention as well as the conventional mobile communication system.
Figure 2:
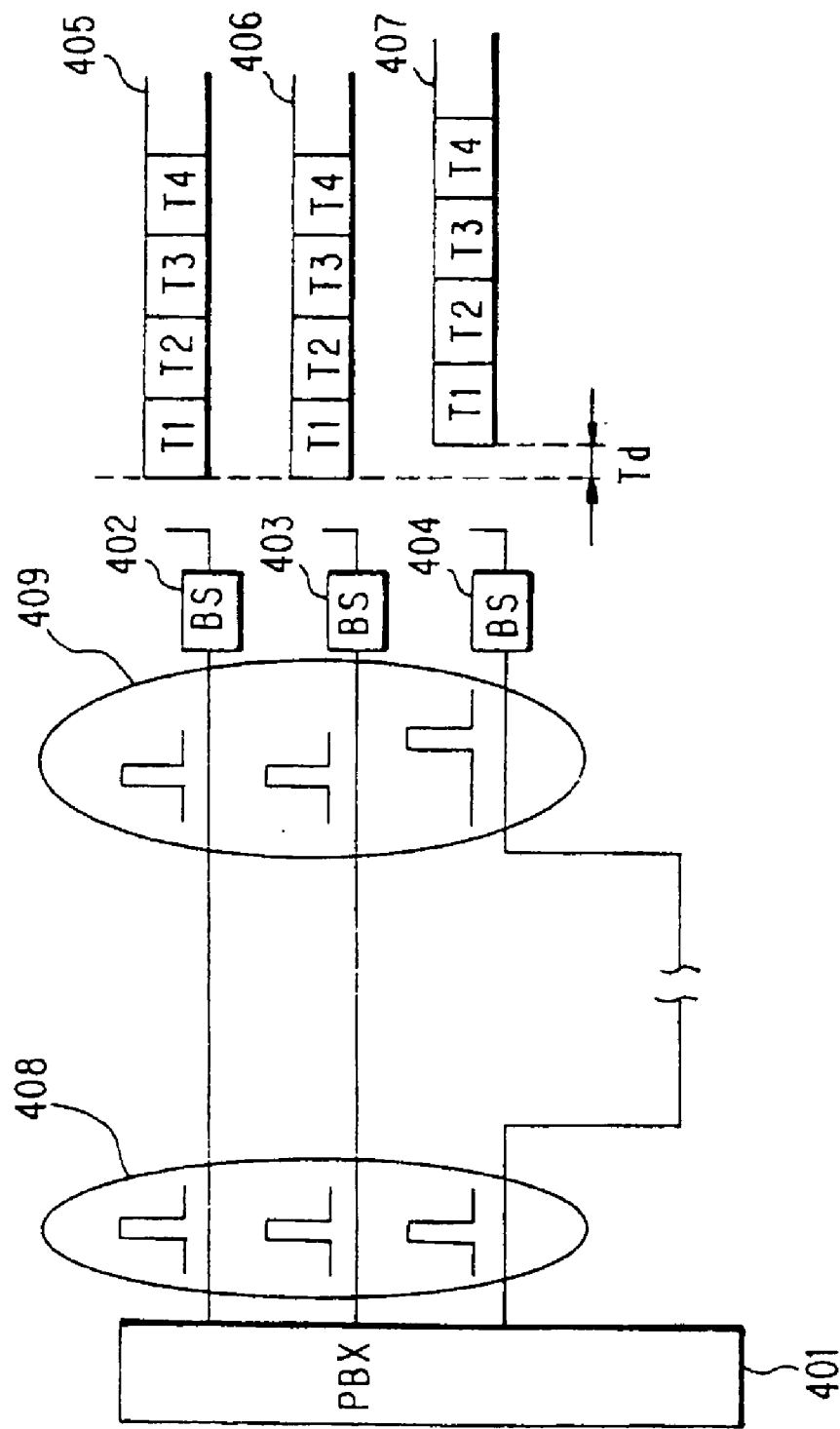
FIG. 2 is a diagram for explaining a synchronizing signal delay between base stations in a conventional mobile communication system.

FIG. 1 shows a preferred embodiment of the invention: for instance, composition of a mobile communication system, such as PHS, conducting radio communication in Time-Division Multiplex. As shown in FIG. 1, a mobile communication system of the invention comprises: a exchange office (PBX) 101 connected with public line network station 50; base stations (BS) 111 to 113 which have a wired connection with such PBX101 and are located at appropriate positions within a predetermined area; and mobile communication terminals (PS) 114 to 115, which transmit/receive signals with such BS 111 to 113 via radio communication.

PBX101 is connected with network station 50 via multiple circuits, and comprising: circuit I/F unit 103 to 105, which are circuit interfaces with network station 50; BSI/F units 108 to 110, which are in charge of interface with BS 111 to 113; speech path switch 102, which conducts exchange control of speech paths on circuit lines; PBX central control unit 106, which regulates the performance of the entire PBX including such speech path switch 102; synchronizing signal generator unit 107 for supplying synchronizing signal to BS111 to 113.

Figure 3:
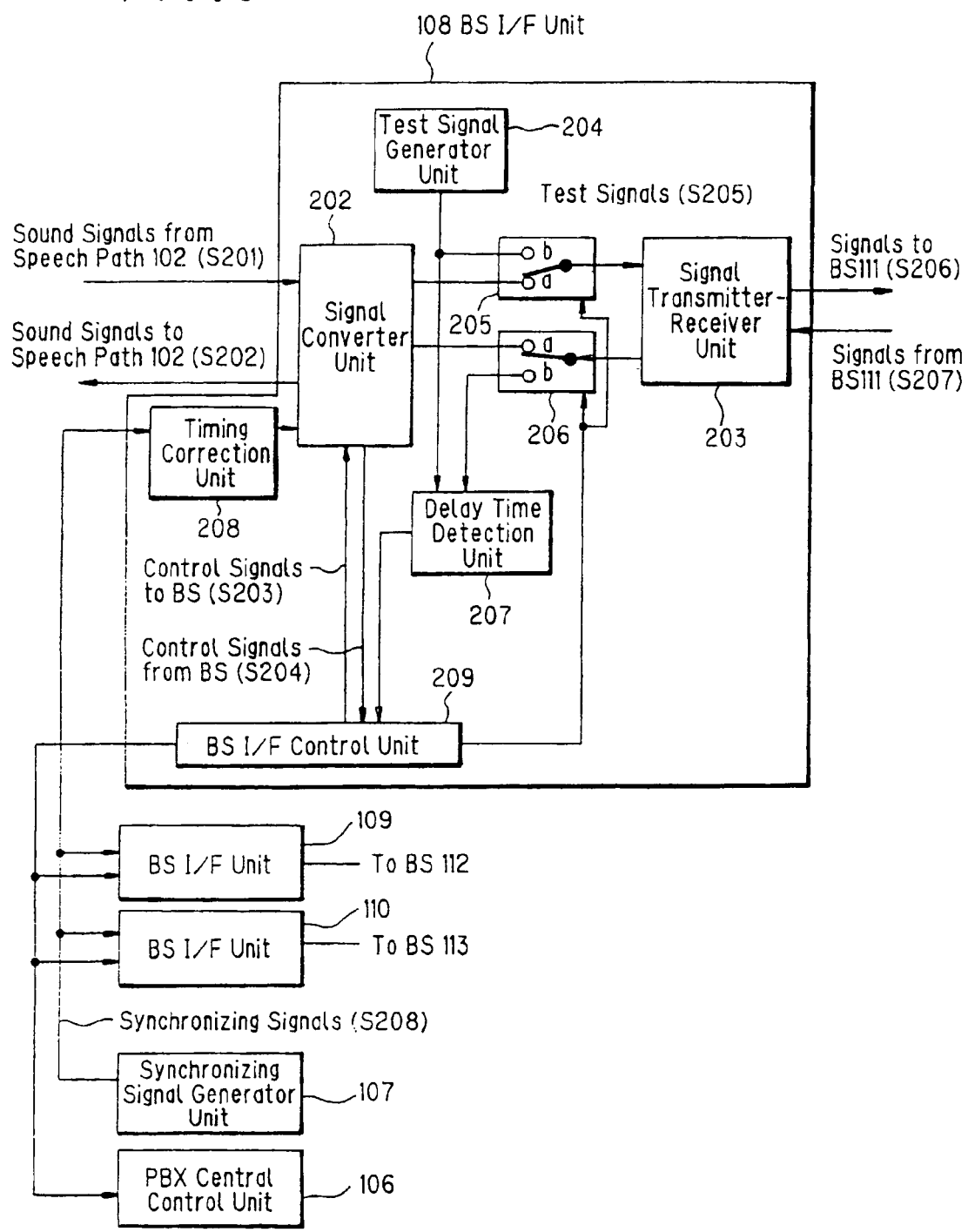
FIG. 3 is a block diagram showing a structure of BSI/F unit shown in FIG. 1.
Figure 4:
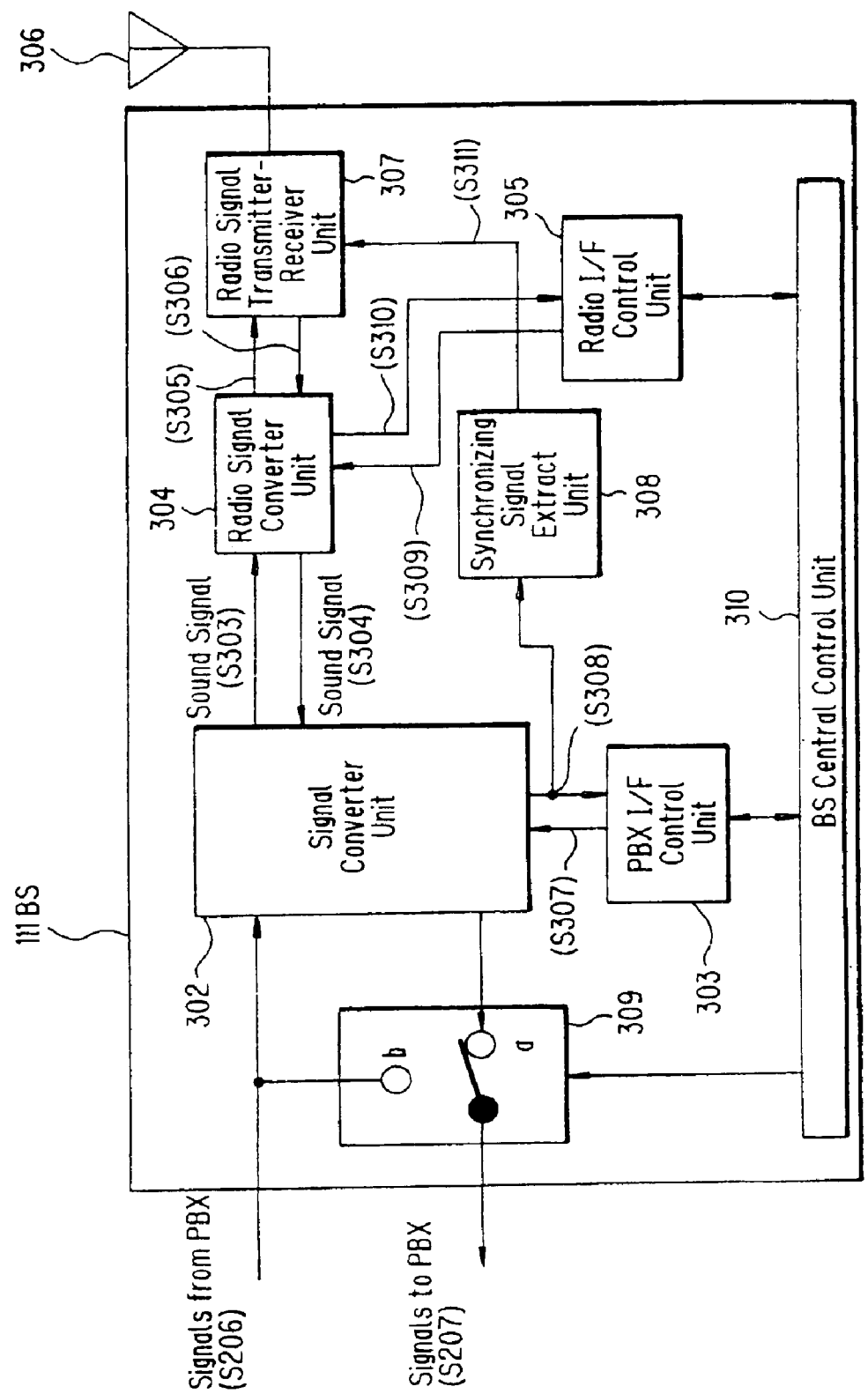
FIG. 4 is a block diagram showing a structure of the BS shown in FIG. 1, FIG 5. is a sequential chart showing a synchronization control method in a mobile communication system according to the invention.

FIG. 3 is a block diagram showing the structure of BS/IF unit shown in FIG. 1. FIG. 4 is a block diagram showing the structure of BS shown in FIG. 1. Although BSI/F unit 108 and BS 111 will be focused as examples in the explanation below, each BS/F unit 108 to 110, and each BS 111 to 113 are assumed to be similar in organization respectively. As shown in FIG. 3, BSI/F unit 108 comprises: signal converter unit 202; signal transmitter-receiver unit 203, transmitting signals with BS111; test signal generator unit 204; two switches 205 and 206; delay time detection unit 207; timing correction unit 208; and BSI/F unit, controlling these units.

Meanwhile, BS111 comprises: signal converter unit 302; PBXI/F control unit 303, connected with this signal converter unit 302; radio signal converter unit 304; radio I/F control unit 305, connected with radio signal converter unit 304; radio signal transmitter-receiver unit 307, with antenna 306, transmitting signals with PS; synchronizing signal extract unit 309, extracting synchronizing signal included in control signal from PBX101; switch 309; BS central control unit, controlling these entire constituents.

A mobile communication system according to the invention is endowed with two modes of action; normal operation mode, and test operation mode for enabling synchronization control, which are switched via directions from PBX central control unit 106. In normal operation mode, switches 205, 206 of BSI/F unit 108, and switch 309 of BS111 are changed to "a" side. In test operation mode, these switches 205, 206 and 309 are changed to "b" side as below.

In normal operation mode, controlling unit 209 of BSI/F unit 108 receives directions from PBX central controlling unit and issues controlling signals to BS111. Synchronizing signal generator unit 107 supplies synchronizing signals with designated timing to each BSI/F unit 108 to 110. The synchronizing signals are sent to signal converter unit 202, after they are corrected in timing correction unit of BSI/F unit shown in FIG. 3. Such signal converter unit 202 multiplexes sound signal from speech path switch 102 (S201), control signal sent from BSI/F unit 209 to BS111 (S203), and synchronizing signal from timing correction unit 208, sending them to BS111 via signal transmitter-receiver unit. Also, it receives signals from BS111 via signal transmitter-receiver unit 203 (S207), and separate them into sound signals to be sent to speech path switch 102 (S202) and control signals to be sent to BSI/F unit 209 (S204).

Signals transmitted from BSI/F unit 108 (S206) are separated to sound signals (S303) and control signals (S308) at signal converter unit 302 of BS111. Control signals are sent to PBXI/F unit 303 and synchronizing signal extract unit 308, and synchronizing signals (S311) are extracted at synchronizing signal extract unit 308. Radio signal converter unit 304 multiplexes in radio signal format sound signal from signal converter unit 302 (S303) and control signals from BS central controlling unit 310 to be input via radio I/F unit 305 (S309). Radio signal transmitter-receiver unit 307 send this multiplexed signal (S305) from antennae 306, with timing of synchronizing signals obtained at synchronizing signal extract unit 308.

Meanwhile, radio signals transmitted from mobile terminal PS are received at radio signal transmitter receiver unit 307 via antenna 306, and separated to sound signals (S304) and control signals (S310) at radio signal converter unit 304. Control signals (S310) are sent to BS central control unit 310 via radio I/F control unit 305; sound signals (S304) are sent to signal converter unit 302. Signal converter unit 302 multiplexes this sound signal (S303) and control signals from PBXI/F control unit and send them to PBX101 (Signal S207). These signals (S207) enter signal transmitter-receiver unit 203 of BSI/F unit 101, and are sent to signal converter unit 202, where they are separated to control signals (S204) and sound signals (S202). Those sound signals (S202) are sent to external network 50, from speech path switch 102 of PBX 101 via unoccupied circuit I/F unit.

This radio communication system is constructed so as to secure continuous call, for example when a mobile terminal PS114 which has been in communication with BS111 moves out to the area for BS112, by switching communication to BS 112 under control of PBX control unit 106. To realize such switching of BS smoothly, it is important to gain synchronization control, which synchronizes, for each BS, frame timing of radio communication. This system attempts to attain this goal by: detecting delay time of transmitting synchronizing signal for each BS under test operation mode, which is to be explained in detail below; computing timing correction value in which radio communication timing is synchronized for every BS and announcing it to each BS; and ensuring each BS to correct synchronizing signals supplied according to such correction value from synchronizing signal generator unit 107 of PBX 101 before using.

Figure 5:
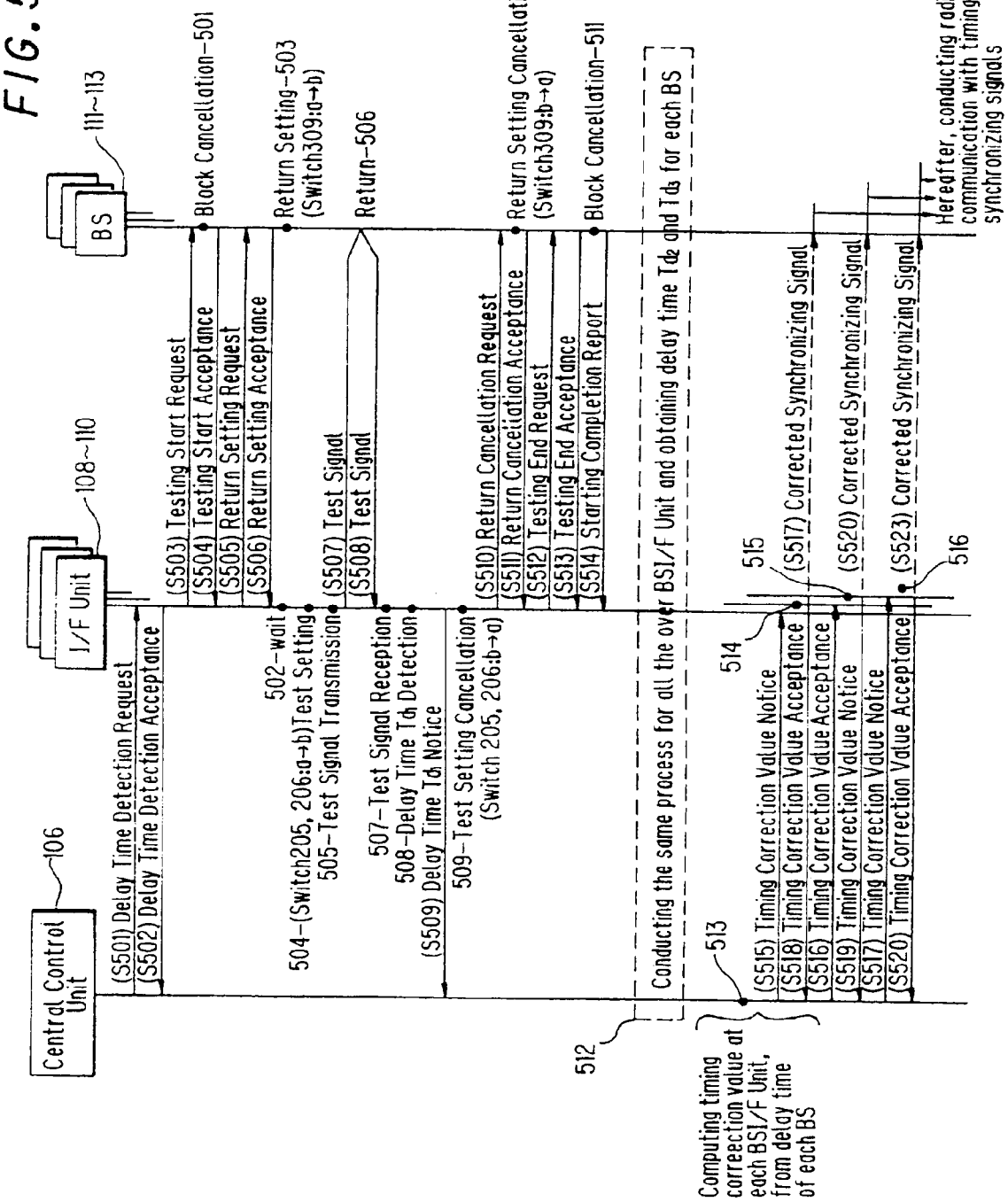

FIG. 5 is a sequential chart explaining how test operation mode of a mobile communication system relating to the invention works. First, in this test operation mode, "delay time detection request" (S501) is sent from PBX central control unit 106 to BSI/F unit log 108. BSI/F unit 108, which receives it, sends back "delay time detection acceptance" (S502) and starts control process toward BS111. In this control process, BSI/F unit sends "testing start request" (S503) to BS111. In response to this, in order to start testing, BS111 stops transmitting and receiving radio signals and conducts block setting (501) to stop accepting the connection of PS. On completion, BS111 sends "testing start acceptance" (S504) to BSI/F unit 100.

Receiving the same signal, BSI/F unit sends "return setting request" (S505) to BS111. BS111, which receives it, send back "return setting acceptance" and change switch 309 shown in FIG. 4 to "b" side. Subsequent signals from PBX 101 are sent by return to PBX101 via switch 309. However, even when switch 309 is set for "b" side, signals from PBX101 are supplied to signal converter unit 302 as well. Receiving "return setting acceptance" (S506), BSI/F unit waits for a certain amount of time and then changes switch 205, 206 to "b" (504).

Once this return setting is completed, test signal (S205) is output (505) from test signal generator unit 204 of BSI/F unit. Since switch 205 is set to "b" side, test signal (S205) is sent out from signal transmitter-receiver unit 203 to BS111. Meanwhile, since switch 309 is set to "b" side in BS111, received signal (S205) is sent back by return to BSI/F unit 108 through switch 309 (signal S207). Signal sent by return to BSI/F unit 108 (S207) is supplied to delay time detection unit 207 via switch 206 which is set to "b" side and compared with test signal (S205) which is sent directly from test signal generator unit 204, so that delay time is detected. At this point, an example of test signal arriving at delay time detection unit 207 is shown in FIG. 6.

In FIG. 6, compared with test signal transmitted from test signal generator unit 204 (S205) shown in the upper part, test signal sent by return from BS111 shown in the lower part (S207) arrives late at delay time detection unit 207. This is the delay caused because BS111 is installed apart from PBX10 and it takes more time to transmit signal. Furthermore, since BS111 to 113 are installed in separate positions, delay time for each BS varies. As mentioned above, according to the present invention, it is structured so as to detect delay time from signal sent to PBX101 by return, a half of delay time for this signal sent by return is delay time in one way of transmission path.

Once transmission path delay time $Td_1$ is detected, BSI/F unit 108 reports detected delay time $Td_1$ to PBX central control unit 106, and cancels test setting by turning back switch 205, 206 to "a" side. Then it sends "return cancel request" (S510) to BS111. Receiving the same signal, BS111 cancels test setting by turning back switch 309 to "a" side, and sends back "return cancel acceptance" (S511). Subsequently, BSI/F unit 108 sends "testing end request" (S512) to BS111. Receiving this, BS111 sends back "testing and acceptance" (S513) and cancels block setting. Owing to this, suspension on transmission and reception of radio signals is canceled and acceptance of PS connection reopens. Once blockage is canceled and normal operating conditions are resumed, it sends "starting completion report" (S514), notifying that the starting was successful.

PBX central control unit 106 conducts similar control over other BSI/F units 109, 110, obtaining transmission path delay time $Td_2$, $Td_3$ for other BS's 112, 113 (512). When delay time for all the BS's 111 to 113 is obtained, timing correction value is computed which allows synchronization of radio communication timing for all the BS's (513), and notified to each timing correction unit of BSI/F unit (S515 to 517). At this point, timing correction value is completed by, after establishing random standard value, computing the difference of delay time from the standard value for each BS, and it is possible to establish the standard value according to, for instance, delay time for BS with the least delay time or timing of synchronizing signal received directly from synchronizing signal generator unit 107. Receiving this timing correction value notice, BSI/F unit 108 records such correction value in timing correction unit 207 (514–516), and sends back timing correction value acceptance (S518–520)

In the operation as below, timing correction unit 208 of BSI/F unit modifies the timing of synchronizing signal supplied from synchronizing signal generator unit 107 according to notified timing correction value, and supplies corrected synchronizing signal to signal converter unit 202. This corrected synchronizing signal is extracted in synchronizing signal extract unit 202 of BS111, and subsequent radio communication is conducted in corrected frame timing. Owing to control as above, radio communication timing for all the BS's 111 to 113 is synchronized.

Incidentally, synchronization control in this test operation mode is suitable, for instance, when the system is operated for the first time or more BS's are installed. Still it may be advantageous, for instance, to execute as a maintenance repeated after a certain period.

As explained above in detail, according to the present invention, it is structured so as to detect delay time of the transmission of synchronizing signal to each base station, to compute timing correction value for each base station on the basis of the delay time and to correct the synchronizing signal supplied to each base station according to the timing correction value, and consequently, it is possible to synchronize timing of radio communication for all the base station.

Therefore, it is possible to prevent interference of adjacent base station to time slot and communication failure due to switch in base station.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching herein set forth.

What is claimed is:

1. A mobile communication system, comprising a plurality of base stations which are located at appropriate positions within a predetermined area and conduct radio communications with a mobile communication terminal, and an exchange office which is connected with said base stations and conducts an exchange control toward an external network, said exchange office conducting a Time Division Multiplex radio communication by providing a synchronizing signal from said exchange office to each of said base stations, said exchange office further comprising:
delay time detection means for detecting an arrival delay time of said synchronizing signal to each of said base stations;
computation means for computing a timing correction value for each base station which synchronizes a radio communication timing of all of said base stations on the basis of a delay time detected; and
correction means for correcting said synchronizing signal supplied to said base stations according to said timing correction value, wherein:
said system comprises switching means for selectively switching an operating conditions thereof to normal and test operating conditions, and makes said delay time detection means operate when said system is in a test operation mode.

2. A mobile communication system, comprising a plurality of base stations which are located at appropriate positions within a predetermined area and conduct radio communications with a mobile communication terminal, and an exchange office which is connected with said base stations and conducts an exchange control toward an external network, said exchange office conducting a Time Division Multiplex radio communication by providing a synchronizing signal from said exchange office to each of said base stations, said exchange office further comprising:
delay time detection means for detecting an arrival delay time of said synchronizing signal to each of said base stations;
computation means for computing a timing correction value for each base station which synchronizes a radio communication timing of all of said base stations on the basis of a delay time detected; and
correction means for correcting said synchronizing signal supplied to said base stations according to said timing correction value;
said delay detection means comprises:
means installed in said exchange office for generating a test signal for delay time detection and sending said test signal to said base stations;
means for sending by return said test signal sent from said exchange office at said base station; and
measuring means for receiving said test signal sent by return from said base stations and for measuring a time difference between time of transmission and arrival of said test signal, wherein:
said system comprises switching means for selectively switching an operating conditions thereof to normal and test operating conditions, and makes said delay time detection means operate when said system is in a test operation mode.

3. A mobile communication system, comprising a plurality of base stations which are located at appropriate positions within a predetermined area and conduct radio communications with a mobile communication terminal, and an exchange office which is connected with said base stations and conducts an exchange control toward an external network, said exchange office conducting a Time Division Multiplex radio communication by providing a synchronizing signal from said exchange office to each of said base stations, said exchange office further comprising:
delay time detection means for detecting an arrival delay time of said synchronizing signal to each of said base stations;
computation means for computing a timing correction value for each base station which synchronizes a radio communication timing of all of said base stations on the basis of a delay time detected; and
correction means for correcting said synchronizing signal supplied to said base stations according to said timing correction value;
said delay detection means comprises:
means installed in said exchange office for generating a test signal for delay time detection and sending said test signal to said base stations;
means for sending by return said test signal sent from said exchange office at said base station; and
measuring means for receiving said test signal sent by return from said base stations and for measuring a time difference between time of transmission and arrival of said test signal;
said computing means establishes a predetermined standard value and computes a difference between said standard value and a delay time of each of said base stations and said timing correction value, wherein:
said system comprises switching means for selectively switching an operating conditions thereof to normal and test operating conditions, and makes said delay time detection means operate when said system is in a test operation mode.

4. A mobile communication system, comprising a plurality of base stations which are located at appropriate positions within a predetermined area and conduct radio communications with a mobile communication terminal, and an exchange office which is connected with said base stations and conducts an exchange control toward an external network, said exchange office conducting a Time Division Multiplex radio communication by providing a synchronizing signal from said exchange office to each of said base stations, said exchange office further comprising:
delay time detection means for detecting an arrival delay time of said synchronizing signal to each of said base stations;
computation means for computing a timing correction value for each base station which synchronizes a radio communication timing of all of said base stations on the basis of a delay time detected; and correction means for correcting said synchronizing signal supplied to said base stations according to said timing correction value;

said delay detection means comprises:

means installed in said exchange office for generating a test signal for delay time detection and sending said test signal to said base stations;

means for sending by return said test signal sent from said exchange office at said base station; and measuring means for receiving said test signal sent by return from said base stations and for measuring a time difference between time of transmission and arrival of said test signal;

said computing means establishes a predetermined standard value and computes a difference between said standard value and a delay time of each of said base stations and said timing correction value;

said computing means establishes a predetermined standard value and computes a difference between said standard value and a delay time of each of said base stations as said timing correction value, wherein:

said system comprises switching means for selectively switching an operating conditions thereof to normal and test operating conditions, and makes said delay time detection means operate when said system is in a test operation mode.

5. A mobile communication system according to claim 1, wherein:

said system executes said test operation mode when operating said system for the first time and/or terminating a maintenance operation including additional installation of said base stations.

6. A mobile communication system according to claim 2, wherein:

said system executes said test operation mode when operating said system for the first time and/or terminating a maintenance operation including additional installation of said base stations.

7. A mobile communication system, according to claim 3, wherein:

said system executes said test operation mode when operating said system for the first time and/or terminating a maintenance operation including additional installation of said base stations.

8. A mobile communication system, according to claim 4, wherein:

said system execute said test operation mode when operating said system for the first time and/or terminating a maintenance operation including additional installation of said base stations.

* * * * *